(12) United States Patent
Vieira et al.

(10) Patent No.: US 12,605,673 B2
(45) Date of Patent: Apr. 21, 2026

(54) METHOD FOR CAPTURING CO₂

(71) Applicant: Petróleo Brasileiro S.A.—Petrobras, Rio de Janeiro (BR)

(72) Inventors: Michele Oliveira Vieira, Porto Alegre (BR); Marcus Seferin, Porto Alegre (BR); Rosane Angélica Ligabue, Porto Alegre (BR); Wesley Formentin Monteiro, Alvorada (BR); Jailton Ferreira do Nascimento, Rio de Janeiro (BR); Sandra Mara Oliveira Einloft, Porto Alegre (BR); Jeane Estela Ayres de Lima, Porto Alegre (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 777 days.

(21) Appl. No.: 17/836,506

(22) Filed: Jun. 9, 2022

(65) Prior Publication Data

US 2022/0401876 A1 Dec. 22, 2022

(30) Foreign Application Priority Data

Jun. 9, 2021 (BR) ...................... 10 2021 011167 4

(51) Int. Cl.
*B01D 53/14* (2006.01)
*B01J 20/34* (2006.01)

(52) U.S. Cl.
CPC ..... *B01D 53/1493* (2013.01); *B01D 53/1425* (2013.01); *B01J 20/34* (2013.01); *B01D 2252/30* (2013.01)

(58) Field of Classification Search
CPC ............ B01D 54/1493; B01D 54/1425; B01D 2252/30; B01D 53/1475; B01J 20/34
See application file for complete search history.

(56) References Cited

U.S. PATENT DOCUMENTS

| | | |
|---|---|---|
| 9,186,618 B2 | 11/2015 | Baugh et al. |
| 9,233,339 B2 | 1/2016 | Lee et al. |
| 2005/0129598 A1 | 6/2005 | Chinn et al. |
| | (Continued) | |

OTHER PUBLICATIONS

Vieira,et.al. ("Chemical fixation of CO2: the influence of linear amphiphilic anions on surface active ionic liquids (SAILs) as catalysts for synthesis of cyclic carbonates under solvent-free conditions", Reaction Kinetics, Mechanisms and Catalysis (2019) 126:987-1001 (Year: 2019).*

(Continued)

*Primary Examiner* — Michael Forrest
(74) *Attorney, Agent, or Firm* — Morrison & Foerster LLP

(57) ABSTRACT

The present invention addresses to a method that uses surface-active surfactants ionic liquids (ILs) with an affinity for water to capture $CO_2$, especially ILs derived from surfactants, of low production cost, fluoride-free, causing a low environmental impact in its use and high yield of $CO_2$ sorption. The $CO_2$ sorption method consists of contacting a gas mixture with at least one of the described ILs, at the working temperature, pressure and partial pressure of $CO_2$. The removal of $CO_2$ is done by pressure reduction. ILs can be reused without loss of efficiency.

8 Claims, 4 Drawing Sheets

[bmim][C₁₂SO₄]   [bmim][C₁₂ESO₄]   [bmim][C₁₂BSO₃]   [bmim][C₁₂SAR]

[TBA][C₁₂SO₄]   [TBA][C₁₂ESO₄]   [TBA][C₁₂BSO₃]   [TBA][C₁₂SAR]

(56)          References Cited

U.S. PATENT DOCUMENTS

2013/0012699 A1      1/2013   Choi et al.
2013/0058852 A1*    3/2013   Atkins ............... B01D 53/1493
                                                                                                   423/226

OTHER PUBLICATIONS

Obliosca,et.al. ("Synthesis and Optical Properties of 1-Alkyl-3-Methylimidazolium Lauryl Sulfate Ionic Liquids", J. Fluoresc. (2007) 17:613-618 (Year: 2007).*
Vieira et al. "Ionic liquids composed of linear amphiphilic anions: Synthesis, physicochemical characterization, hydrophilicity and interaction with carbon dioxide" Journal of Molecular Liquids 241 (2017) 64-73.*
Li et al. (Protic ionic liquids with low viscosity for efficient and reversible capture of carbon dioxide, Intl Journal of Greenhouse Gas Control, 90, Article 102801 (2019).*
Viera et al ("Chemical fixation of CO2: the influence of linear amphiphilic anions on surface active ionic liquids (SAILs) as catalysts for synthesis of cyclic carbonates under solvent-free conditions", Reaction Kinetics, Mechanisms of Catalysis (2019) 126, pp. 9870-1001) (Year: 2019).*
Nascimento (2017) "CO2 Balance in Aqueous Mixtures of Amines and Ionic Liquids", (Dissertation)—Federal University of Rio de Janeiro, School of Chemistry, 226 pages.
Souza et al. (Jun. 2018) "CO2 Sorption Using Ionic Liquid Additivated with Surface Area Extenders", Quimica Nova, 41(6); 656-661.
Vieira et al. (2017) "Ionic Liquids Composed of Linear Amphiphilic Anions: Synthesis, Physicochemical Characterization, Hydrophilicity and Interaction With Carbon Dioxide", Journal of Molecular Liquids, 241;64-73.

* cited by examiner

Figure 1

METHOD FOR CAPTURING CO$_2$

CROSS-REFERENCE TO RELATED APPLICATION

This application claims priority to Brazilian Application No. 10 2021 011167 4, filed on Jun. 9, 2021, and entitled "METHOD FOR CAPTURING CO$_2$," the disclosure of which is incorporated herein by reference in its entirety.

FIELD OF INVENTION

The present invention addresses to a method that uses surface-active surfactants ionic liquids (ILs) with affinity for water applied in processes of capture of acidic gases in gas mixtures, especially carbon dioxide (CO$_2$), even in high concentration. It aims at replacing current CO$_2$ capture technologies providing a low production cost, high CO$_2$ sorption yield and with the advantage of being fluorine-free, which causes a low environmental impact.

DESCRIPTION OF THE STATE OF THE ART

The separation of CO$_2$ from gas streams is a process of great interest in carbon capture technologies, especially applicable in exhaust gases from combustion and natural gas (NG) purification. To this end, the main technologies involve membrane permeation (MP), chemical absorption (CA) and physical absorption (PA). In the case of CO$_2$ separation from hydrocarbons (HC), the main advantage of CA is its selectivity, since it operates by chemical reaction between CO$_2$ and amine derivatives. The main advantage of removing CO$_2$ by PA is the lower energy cost of the CO$_2$ desorption process, which occurs by pressure reduction. However, in addition to the lower selectivity of PA, compared to CA, the vapor pressure of the physical solvent leads to material losses in the CO$_2$ desorption processes. The reference technology for CO$_2$ CA is sorption with alkanolamine solutions. Its main advantage is its efficient applicability both in processes with low input gas pressures, such as exhausted gases, and for gases at high pressures, such as natural gas. This process, although efficient in capturing, requires a large amount of energy during the regeneration process, which increases the cost of the gas capture process as a whole. Other disadvantages of amine-based CA are the need for amine make-up, corrosion on equipment, toxicity of amines and degradation products, and significant loss of efficiency if used in mixtures with high CO$_2$ partial pressure. The latter gains importance in the case of NG purification with high levels of CO$_2$, which is observed in several pre-salt fields.

The selective affinity of ILs for CO$_2$ in relation to HC and the good CO$_2$ sorption capacity with high partial pressures that some ILs present, make ILs attractive materials to replace amines. However, most ILs have high production costs and many of them have a low affinity for water, usually present in the gas streams to be purified.

There are patent applications that introduce ILs in CO$_2$ sorption processes, such as US2013/0012699 or US2005/0129598. It is also the case of the U.S. Pat. No. 9,186,618, which discloses the dissolution of amines in ILs and direct use in CA.

The modified amine solutions are the basis of the technology used for chemical sorption of CO$_2$. Such processes have high energy demand, high solution replacement rates (make-up), high temperature degradation generating toxic volatile products and marked corrosion in equipment in the presence of CO$_2$. Amines are toxic and their disposal process is not trivial.

Thus, many ILs have been tested to capture CO$_2$. ILs are commonly liquid salts at room temperature. They have low vapor pressure, low volatility, low flammability, high chemical, electrochemical and thermal stability and are reusable. ILs help prevent equipment corrosion. The costs of commercial ILs are high, making their implementation in CO$_2$ and acidic gas capture processes difficult. Few ILs are available on an industrial scale, making their use on a large scale difficult.

The paper by VIEIRA, M. O. et al. (2017) "Ionic liquids composed of linear amphiphilic anions: synthesis, physico-chemical characterization, hydrophilicity and interaction with carbon dioxide", Journal of Molecular Liquids, v. 241, p. 64-73, describes the synthesis and physical-chemical characterizations of four ionic liquids, in which there is shown a theoretical study of the molecular interaction of ionic liquids with CO$_2$, proving that there is an affinity; however, a CO$_2$ capture process is not mentioned.

The study by SOUZA, A. L. A. et al. (2018) "CO$_2$ sorption using Ionic Liquid additivated with surface area extenders", Química Nova, v. 41, no. 6, p. 656-661 refers to a study of the interaction between glass microspheres and ionic liquids ([bmim][BF$_4$] and [bmim][NTf$_2$]) in the CO$_2$ sorption process at high pressure (27 bar (2.7 MPa)) at temperatures of 30, 40 and 50° C. This study uses structurally very distinct ionic liquids with surface area extenders for CO$_2$ capture.

The dissertation by NASCIMENTO, M. V. C. (2017) "CO$_2$ balance in aqueous mixtures of amines and ionic liquids", (Dissertation)—Federal University of Rio de Janeiro, School of Chemistry, 226 p., describes a study and development of models of absorption of CO$_2$, using ionic liquids as solvents, whether pure or mixed with water and amine, consistent for the purpose of design and simulation of acidic gas capture processes. However, it approaches a theoretical study of CO$_2$ sorption using ionic liquids, comparing with literature data and not an experimental study.

U.S. Pat. No. 9,233,339 discloses a composite structure to capture a gaseous electrophilic species, the structure being composed of mesoporous refractory sorbent particles in which an ionic liquid is covalently bonded, wherein said ionic liquid includes an accessible functional group that is capable of bind to said gaseous electrophilic species. However, it focuses on refractory fiber structures, where ionic liquids functionalized with silane groups are anchored. For this, silica is used as a support. As a result, there is no possibility of this structure being used to capture polluting gases.

In this way, it is noted that ionic liquids are a broad class of compounds, synthesized and applied in the most varied areas, in which numerous molecular structures of ionic liquids are present in the literature.

In order to solve such problems, the present invention was developed, which presents a method for capturing CO$_2$ by means of ionic liquids derived from surfactants in order to replace the materials commonly used in the traditional CO$_2$ capture process. The proposed ionic liquids can be used in pre-existing CO$_2$ capture process units.

The method of capturing CO$_2$ using ionic liquids (physical solvents) is ideal when partial pressures are high, unlike the capture process with amines which requires lower partial pressures.

The ILs are solvents that are easy to reuse and do not cause the operational problems of amines, such as high degradation, high energy of regeneration and corrosion of equipment.

In addition, ILs are materials with low added value precisely because their starting product is a very abundant commercial product on the market and at low cost. They have competitive $CO_2$ sorption capacity, operational advantages over amines, less toxicity, work in more adverse conditions than existing commercial products and can be used both for streams with low concentrations of $CO_2$ and for streams with high contents of this gas.

The ILs described in the invention can be applied at low pressures, as in exhaust gas purification, or at high pressures and high levels of carbon dioxide, as in natural gas purification.

The stability of these ionic liquids brings an additional economic advantage, allowing their reuse, reducing replacement rates (make-up) and residue management. Unlike amine solutions and their degradation products, ionic liquids have high electrochemical stability and are not potentially corrosive, increasing infrastructure life and reducing operation and maintenance costs. The reuse of said ILs reduces the need for process residue management.

BRIEF DESCRIPTION OF THE INVENTION

The present invention addresses to a method of capturing $CO_2$ consisting of contacting the gaseous mixture containing $CO_2$ with the ionic liquids, in the process conditions of exhausted gases or natural gas, high or low pressures, in an absorption string. Desorption occurs by decompression, which can be done in one or more stages. The negligible volatility, chemical and electrochemical stability of ILs reduce the potential for equipment corrosion and the constant need for sorbent make-up.

The ionic liquids proposed for the $CO_2$ capture method of this invention fulfill the same role as the amine solutions with regard to selectivity in $CO_2$ capture and are miscible in water, with the exception of $[TBA][C_{12}SO_4]$. Their great differential is that they have a surface-active side chain, since they are surfactant derivatives, which makes them surfactants with great affinity for water. They are not degradable at high temperatures, in addition to having a low synthesis cost and being fluorine-free. They can also be adapted for use in pre-existing $CO_2$ capture structures.

BRIEF DESCRIPTION OF DRAWINGS

The present invention will be described in more detail below, with reference to the attached figures which, in a schematic manner and not limiting the inventive scope, represent examples of its embodiment. In the drawings, there are:

FIG. 1 illustrating the structures of the ionic liquids used in the present invention;

DETAILED DESCRIPTION OF THE INVENTION

Figure 2:
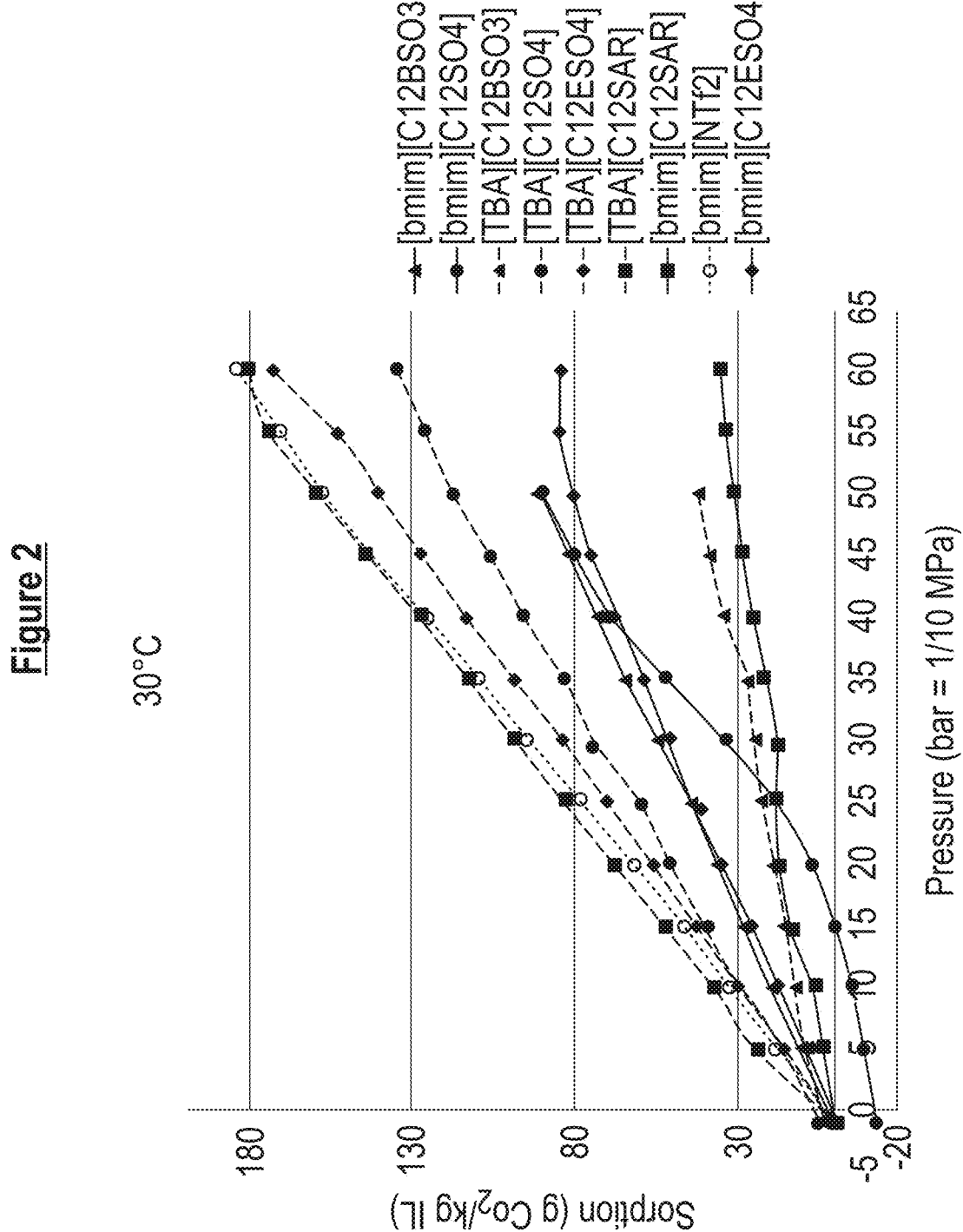
FIG. 2 illustrating a graph of $CO_2$ sorption in ILs at a temperature of 30° C.

The method of capturing $CO_2$ according to the present invention consists of contacting the gas mixture containing $CO_2$ with the ionic liquids, in the process conditions of exhausted gases or natural gas, high or low pressures, in an absorption string. Desorption occurs by decompression, which can be done in one or more stages. The negligible volatility, chemical and electrochemical stability of ILs reduce the potential for equipment corrosion and the constant need for sorbent make-up.

Figure 1:
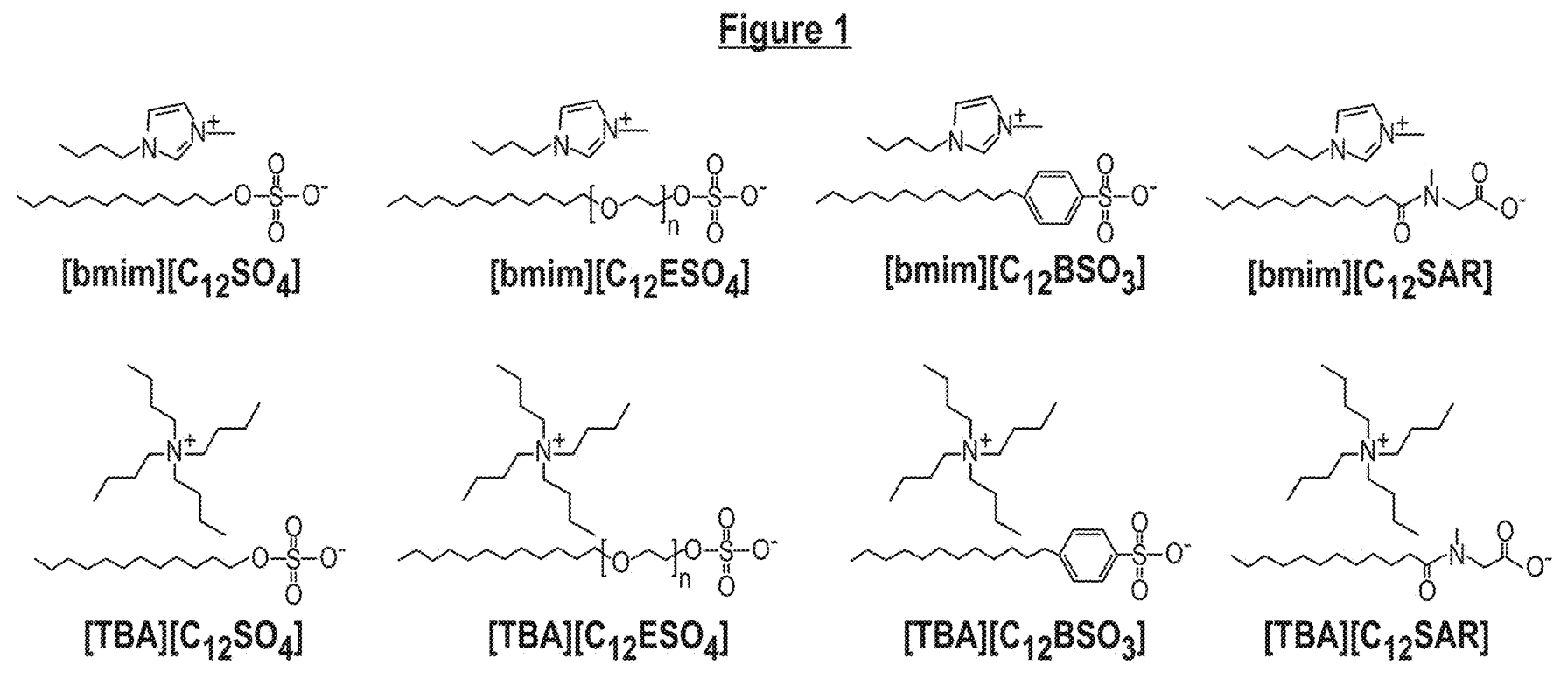

The ionic liquids used in the present invention, whose structures are represented in FIG. 1, are as follows:

1) 1-butyl-3-methylimidazolium lauryl sulfate: [bmim] $[C_{12}SO_4]$;

2) 1-butyl-3-methylimidazolium lauryl ether sulfate: $[bmim][C_{12}ESO_4]$;

3) 1-butyl-3-methylimidazolium lauryl benzene sulfonate: $[bmim][C_{12}BSO_3]$;

4) 1-butyl-3-methylimidazolium lauroyl sarcosinate: $[bmim][C_{12}SAR]$;

5) tetra-n-butylammonium lauryl sulfate: [TBA] $[C_{12}SO_4]$;

6) tetra-n-butylammonium lauryl ether sulfate: [TBA] $[C_{12}ESO_4]$;

7) tetra-n-butylammonium lauryl benzene sulfonate: $[TBA][C_{12}BSO_3]$;

8) tetra-n-butylammonium lauroyl sarcosinate: [TBA] $[C_{12}SAR]$.

The ILs proposed in this invention, as they are derived from low-cost and easily obtainable commercial surfactants, are much cheaper than the traditional commercial ILs supplied in the market. Its $CO_2$ sorption capacity was determined on a thermomagnetic suspension microbalance (MSB). The test results showed a competitive sorption capacity with current commercial systems. The proposed ILs can be used in high or low pressure processes, in exhaust gas purification or natural gas purification, even with high partial pressures of carbon dioxide.

The costs for obtaining the ILs that are used in the $CO_2$ capture method of the present invention are lower than $[bmim][NTf_2]$. Normally, the value of an IL, when moving from the bench scale to the industrial scale, has a cost reduction of approximately 90%. With this premise, it is estimated a production cost close to R\$ 1000.00/kg [bmim] $[NTf_2]$, while the costs of the proposed ILs range from R\$ 70.00/kg $[TBA][Cl_{12}ESO_4]$ to R\$ 435.00/kg [bmim] $[C_{12}SAR]$. The costs of capturing $CO_2$ with ionic liquids are estimated at T=50° C. and P=50 bar (5.0 MPa), for comparison purposes (Table 1). The calculation considered only one $CO_2$ capture cycle, although the ILs have a high regeneration capacity. The reference IL $[bmim][NTf_2]$ had a sorption cost of R\$ 89.50/g $CO_2$ captured. The [bmim] $[C_{12}ESO_4]$ and $[TBA][C_{12}SO_4]$ achieve savings of 70 and 80%, respectively, in relation to the reference IL. The result shows that the $CO_2$ capture method described in this invention overcomes one of the major limitations of the use of ionic liquids in a process, the high cost of the material.

TABLE 1

| | | Cost economy of synthesis (%)** | Sorbed amount (g $CO_2$ sorbed/kg IL) | Cost of sorption (R$/g captured $CO_2$) |
|---|---|---|---|---|
| IL | Price/kg* | | | |
| [bmim][NTf$_2$] | R$ 10,000.00 | — | 111.73 | 89.50 |
| [bmim][C$_{12}$SO$_4$] | R$ 2,137.00 | 78.63 | 35.44 | 60.22 |
| [bmim][C$_{12}$ESO$_4$] | R$ 1,490.00 | 85.10 | 61.90 | 24.07 |
| [bmim][C$_{12}$BSO$_3$] | R$ 1,764.00 | 82.36 | 31.10 | 56.72 |
| [bmim][C$_{12}$SAR] | R$ 4,356.00 | 56.44 | 18.65 | 233.56 |
| [TBA][C$_{12}$SO$_4$] | R$ 943.00 | 90.57 | 57.32 | 16.45 |
| [TBA][C$_{12}$ESO$_4$] | R$ 684.00 | 93.16 | 101.46 | 6.47 |
| [TBA][C$_{12}$BSO$_3$] | R$ 794.00 | 92.06 | 25.99 | 30.55 |
| [TBA][C$_{12}$SAR] | R$ 2,779.00 | 72.21 | 97.38 | 28.53 |

*data based on 2021 values.
**data based on 2021 values and as a comparison reference the [bmim][NTf$_2$].

By means of the data and results shown, a capture process using ILs derived from surfactants is able to overcome several negative points for both the current capture process, using amine solutions, as well as the proposals aimed at the use of other ILs. In the first case, comparing with amine solutions, the process using ILs derived from surfactants only needs reduced pressure during the regeneration step, which will reduce the total cost of the capture process by a drastic energy reduction. Regarding the use of other ILs, as mentioned above, the cost of the solvent is the main negative point. However, the ILs derived from surfactants have a low cost, making them competitive in the market. The main advantage is the application of low-cost, non-fluorinated ILs, derived from common commercial surfactants, which have affinity and miscibility with water, so that these materials can be applied in aqueous solutions or dispersions, which tends to greatly increase the feasibility of its application in industrial processes. The use of ionic liquids as described in the invention can be applied at different stages in the purification processes of natural gas streams rich in $CO_2$ and water.

EXAMPLES

Surfactant-derived ILs with an affinity for water proposed for application in $CO_2$ capture are obtained from low-cost, easy-to-obtain and comprehensive commercial reagents. They can be used in an existing capture structure or with minor modifications, favoring the replacement of technology. ILs have the ability to sorb $CO_2$ at high partial pressures, while amines require lower partial pressures. The regeneration of ILs can be done only by pressure difference, without the need for temperature, whereas amines need one more step in the process with great energy expense and constant make-up, which is the distillation step. Amines are primarily responsible for the corrosion effects (both in the absorption and regeneration unit) of the steels that form the process equipment, including AISI 304 and AISI 316 stainless steels, due to their highly reactive degradation products; in addition to not generating degradation compounds, ILs have the ability to form a protective film on equipment, making corrosion processes even more difficult.

The chemical structures of the ionic liquids proposed in this invention for the $CO_2$ capture method are shown in FIG. 1.

$CO_2$ sorption measurements were performed by gravimetry in a thermomagnetic suspension balance (MSB). The results of the tests in the isotherm at 30° C. and pressure variation from 0 to 60 bar (6.0 MPa) are shown in Table 2 and FIG. 2.

TABLE 2

| | [bmim] [NTf$_2$] (g $CO_2$/ kg IL) | [bmim] [C$_{12}$SO$_4$] (g $CO_2$/ kg IL) | [bmim] [C$_{12}$ESO$_4$] (g $CO_2$/ kg IL) | [bmim] [C$_{12}$BSO$_3$] (g $CO_2$/ kg IL) | [bmim] [C$_{12}$SAR] (g $CO_2$/ kg IL) | [TBA] [C$_{12}$SO$_4$] (g $CO_2$/ kg IL) | [TBA] [C$_{12}$ESO$_4$] (g $CO_2$/ kg IL) | [TBA] [C$_{12}$BSO$_3$] (g $CO_2$/ kg IL) | [TBA] [C$_{12}$SAR] (g $CO_2$/ kg IL) |
|---|---|---|---|---|---|---|---|---|---|
| Pressure* (bar = 1/10 MPa) | | | | | | | | | |
| −1 | −1.13 | −0.88 | −2.57 | −1.66 | 0.43 | 5.58 | 1.10 | 4.52 | −0.80 |
| 5 | 17.72 | −0.53 | 7.41 | 10.17 | 3.66 | 16.42 | 14.99 | 8.13 | 23.91 |
| 10 | 32.73 | −0.62 | 16.34 | 18.79 | 6.60 | 30.50 | 28.73 | 11.80 | 36.54 |
| 15 | 46.32 | 0.67 | 26.38 | 27.74 | 14.01 | 39.11 | 42.35 | 15.39 | 52.06 |
| 20 | 61.51 | 6.58 | 34.93 | 36.16 | 16.79 | 51.34 | 55.31 | 18.72 | 67.87 |
| 25 | 78.10 | 17.76 | 43.96 | 44.41 | 18.72 | 60.02 | 69.49 | 22.60 | 83.28 |
| 30 | 94.67 | 33.67 | 50.68 | 53.67 | 17.45 | 74.81 | 83.60 | 26.08 | 98.77 |
| 35 | 110.21 | 52.38 | 58.20 | 63.77 | 21.79 | 83.48 | 98.06 | 27.18 | 112.97 |
| 40 | 125.15 | 68.30 | 65.98 | 72.42 | 26.30 | 95.61 | 112.99 | 34.05 | 127.64 |
| 45 | 144.13 | 80.25 | 75.23 | 81.34 | 28.78 | 105.47 | 127.16 | 37.93 | 144.51 |
| 50 | 158.02 | 89.68 | 80.57 | 91.09 | 30.96 | 118.40 | 140.59 | 42.00 | 160.03 |
| 55 | 171.21 | | 84.50 | | 33.53 | 126.70 | 153.37 | | 174.57 |
| 60 | 184.02 | | 84.07 | | 34.48 | 133.75 | 172.71 | | 180.62 |

*barometric pressure

7

The ILs that stood out the most at 30° C. were [bmim] [NTf₂] and [TBA][C₁₂SAR] reaching 184.01 and 180.62 g $CO_2$ sorbed/kg IL, respectively. Just below, showing great potential, due to the sorption cost (Table 1), there is [TBA] [C₁₂ESO₄].

Figure 3:
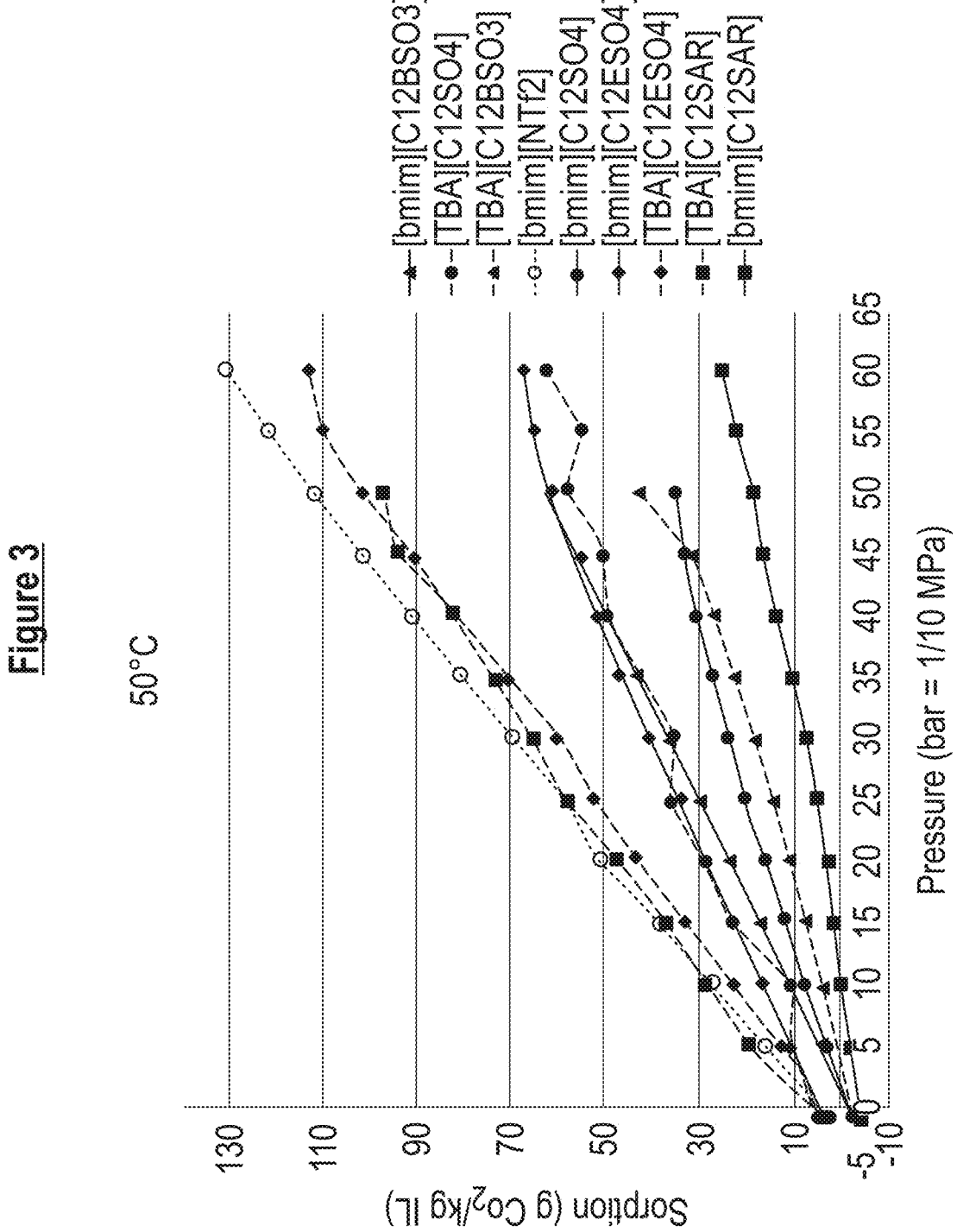
FIG. 3 illustrating a graph of $CO_2$ sorption in ILs at a temperature of 50° C.

Table 3 and FIG. 3 show the results of $CO_2$ sorption in the isotherm at 50° C. in ionic liquids. [TBA][C₁₂ESO₄] showed high $CO_2$ sorption capacity, with linearity up to the highest pressure tested, showing no IL saturation in the tested range. The results are comparable to those achieved by [bmim] [NTf₂], which is the IL of reference and with a much higher cost, as shown in Table 1.

[TBA][C₁₂SAR] showed competitive $CO_2$ sorption capacity, although its production cost is higher than the cost of [TBA][C₁₂ESO₄]. The ILs [TBA][C₁₂ESO₄] and [TBA] [C₂SO₄] also showed good $C_2$ sorption capacities, reaching 50% of the sorption capacity of [bmim][NTf₂], showing the potential of these ILs for use in $CO_2$ capture plants. It is concluded that the anion [C₁₂ESO₄], both for the cation [bmim]⁺ and for the cation [TBA]⁺, presents good results. In the isotherm at 50° C., the $CO_2$ sorption values are lower than in the isotherm at 30° C. This result was already expected due to the fact that, with an increase in temperature, the kinetic energy of the molecules increases, facilitating the desorption of the gas. The differential of the method of capturing $CO_2$ using ILs is the capacity of integral regeneration of the material.

8 compounds generated in the degradation of amines (HSS—heat stable salts) are mainly responsible for the corrosion effects of the steels that form the process equipment, including stainless steels AISI 304 and AISI 316 (both in the absorption unit and in regeneration). In addition to not generating degradation compounds, ILs have the ability to form a protective film on equipment, making corrosion processes even more difficult.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A method for capturing $CO_2$ comprising:
   contacting a gaseous mixture containing $CO_2$ with a solution or dispersion comprising water and ionic liquids to capture $CO_2$ at a temperature of 30-50° C. and a pressure of 5-60 bar, wherein the ionic liquids are tetra-n-butylammonium lauryl ether sulfate ([TBA] [C₁₂ESO₄]); tetra-n-butylammonium lauroyl sarcosinate ([TBA][C₁₂SAR]); or combinations thereof; and desorbing the captured $CO_2$ from the solution or dispersion.

TABLE 3

Results of $CO_2$ sorption in ILs at 50° C. of temperature.

| Pressure* (bar = ¹⁄₁₀ MPa) | [bmim] [NTf₂] (g CO₂/ kg IL) | [bmim] [C₁₂SO₄] (g CO₂/ kg IL) | [bmim] [C₁₂ESO₄] (g CO₂/ kg IL) | [bmim] [C₁₂BSO₃] (g CO₂/ kg IL) | [bmim] [C₁₂SAR] (g CO₂/ kg IL) | [TBA] [C₁₂SO₄] (g CO₂/ kg IL) | [TBA] [C₁₂ESO₄] (g CO₂/ kg IL) | [TBA] [C₁₂BSO₃] (g CO₂/ kg IL) | [TBA] [C₁₂SAR] (g CO₂/ kg IL) |
|---|---|---|---|---|---|---|---|---|---|
| −1 | 2.10 | −1.91 | 3.24 | −3.20 | −4.34 | 5.42 | 1.54 | −2.48 | 3.47 |
| 5 | 16.14 | 3.16 | 9.82 | 4.19 | −2.26 | 10.85 | 13.10 | 1.37 | 19.49 |
| 10 | 27.50 | 8.30 | 16.25 | 10.48 | −0.18 | 10.77 | 23.33 | 3.91 | 28.68 |
| 15 | 38.99 | 12.09 | 22.49 | 17.13 | 1.50 | 22.64 | 32.95 | 7.43 | 37.15 |
| 20 | 50.83 | 15.87 | 28.61 | 23.63 | 2.99 | 28.78 | 42.91 | 10.78 | 47.72 |
| 25 | 58.35 | 20.38 | 34.13 | 29.94 | 4.96 | 36.10 | 51.60 | 14.22 | 58.04 |
| 30 | 69.99 | 23.92 | 40.42 | 36.76 | 7.27 | 35.60 | 60.12 | 18.22 | 64.99 |
| 35 | 81.45 | 27.52 | 46.41 | 43.40 | 10.12 | 43.43 | 70.50 | 22.71 | 73.28 |
| 40 | 91.71 | 30.84 | 50.86 | 49.74 | 13.64 | 49.25 | 81.53 | 26.75 | 82.19 |
| 45 | 102.14 | 33.31 | 56.51 | 55.86 | 16.54 | 50.50 | 90.57 | 32.17 | 93.89 |
| 50 | 111.74 | 35.45 | 61.91 | 63.31 | 18.65 | 57.32 | 101.47 | 42.86 | 97.38 |
| 55 | 121.56 | | 65.32 | | 22.33 | 55.69 | 109.82 | | |
| 60 | 130.87 | | 67.86 | | 25.22 | 62.48 | 113.19 | | |

*barometric pressure

Figure 4:
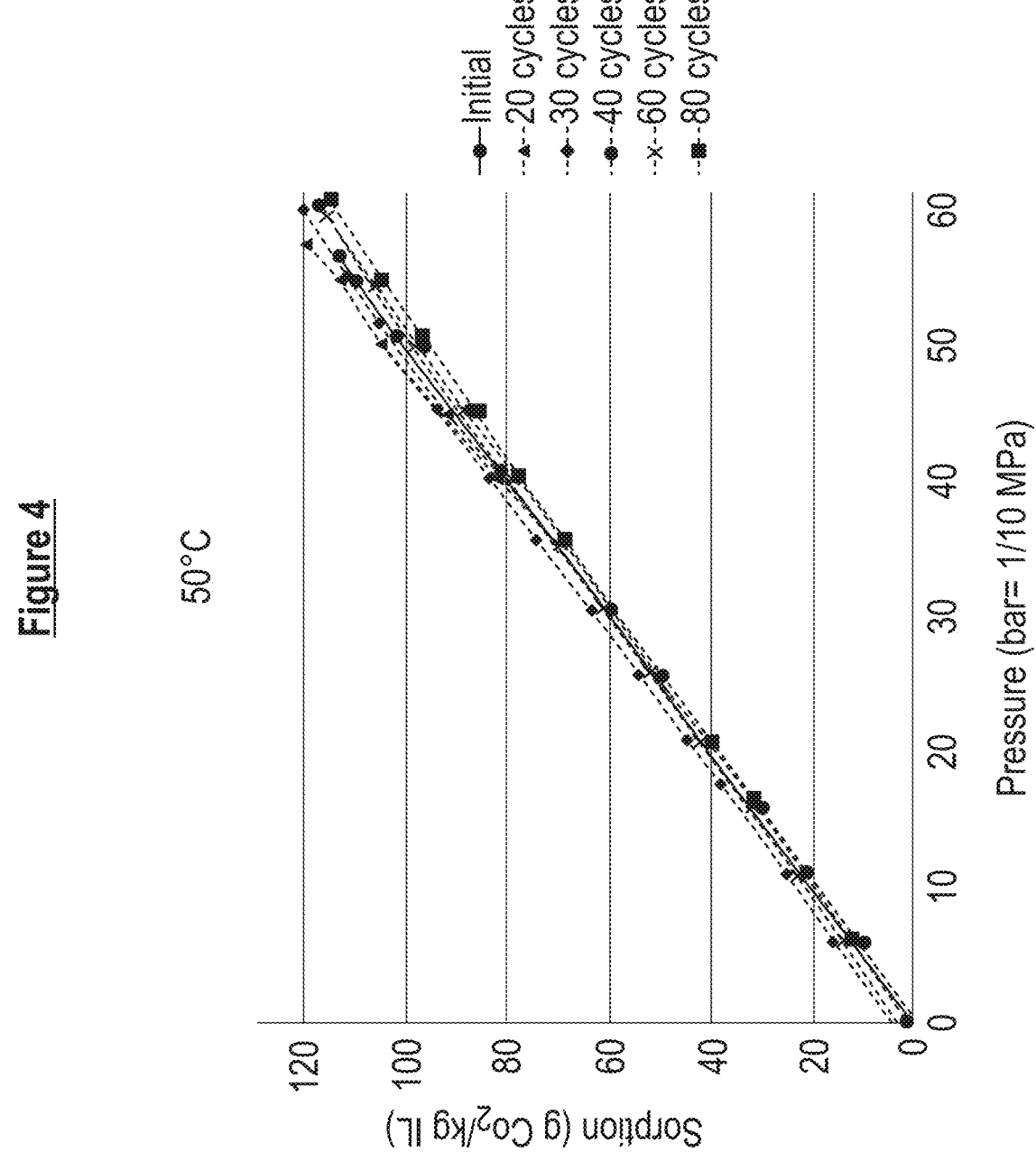
FIG. 4 illustrating a graph of sorption and desorption cycles of $CO_2$ in $[TBA][C_{12}ESO_4]$ at a temperature of 50° C.

FIG. 4 shows the results obtained with 80 cycles of sorption/desorption of $CO_2$ in [TBA][C₁₂ESO₄] at 50° C. of temperature.

Thus, the cost reduction of the $CO_2$ capture method using the proposed ILs is proven. The regeneration of ILs [TBA] [C₁₂ESO₄] takes place by reducing the pressure at room temperature, with reduced energy consumption when compared to the use of amines, as there will be no need to heat the solvent in the regeneration step. As the vapor pressure of ILs is practically negligible, there is no need for continuous make-up, as is done with amines, reducing the operational cost of the process. When keeping a comparison between the ILs and the amines, in relation to the stability of the compounds during the process, there are other advantages: amines undergo thermal and chemical degradation forming compounds of high chemical reactivity and toxicity (such as formaldehydes), whereas the ILs described in this patent are stable in oxidizing and $CO_2$ atmospheres. In addition, such 2. The method according to claim 1, wherein the ionic liquids are fluorine-free.

3. The method according to claim 1, wherein desorbing the captured $CO_2$ from the solution or dispersion comprises decompression in one or more stages.

4. The method of claim 3, wherein decompression comprises pressure reduction.

5. The method of claim 4, wherein desorbing the captured $CO_2$ from the solution or dispersion comprises decompression without heating the solution or dispersion.

6. The method of claim 5, wherein desorbing the captured $CO_2$ from the solution or dispersion occurs at room temperature.

7. The method of claim 1, wherein the gaseous mixture is an exhaust gas or a natural gas.

8. The method of claim 1, wherein the gaseous mixture has a high partial pressure of $CO_2$.

* * * * *